June 18, 1946.   I. M. DILLER   2,402,381
PROCESS OF WELDING AND APPARATUS THEREFOR
Filed Feb. 6, 1943
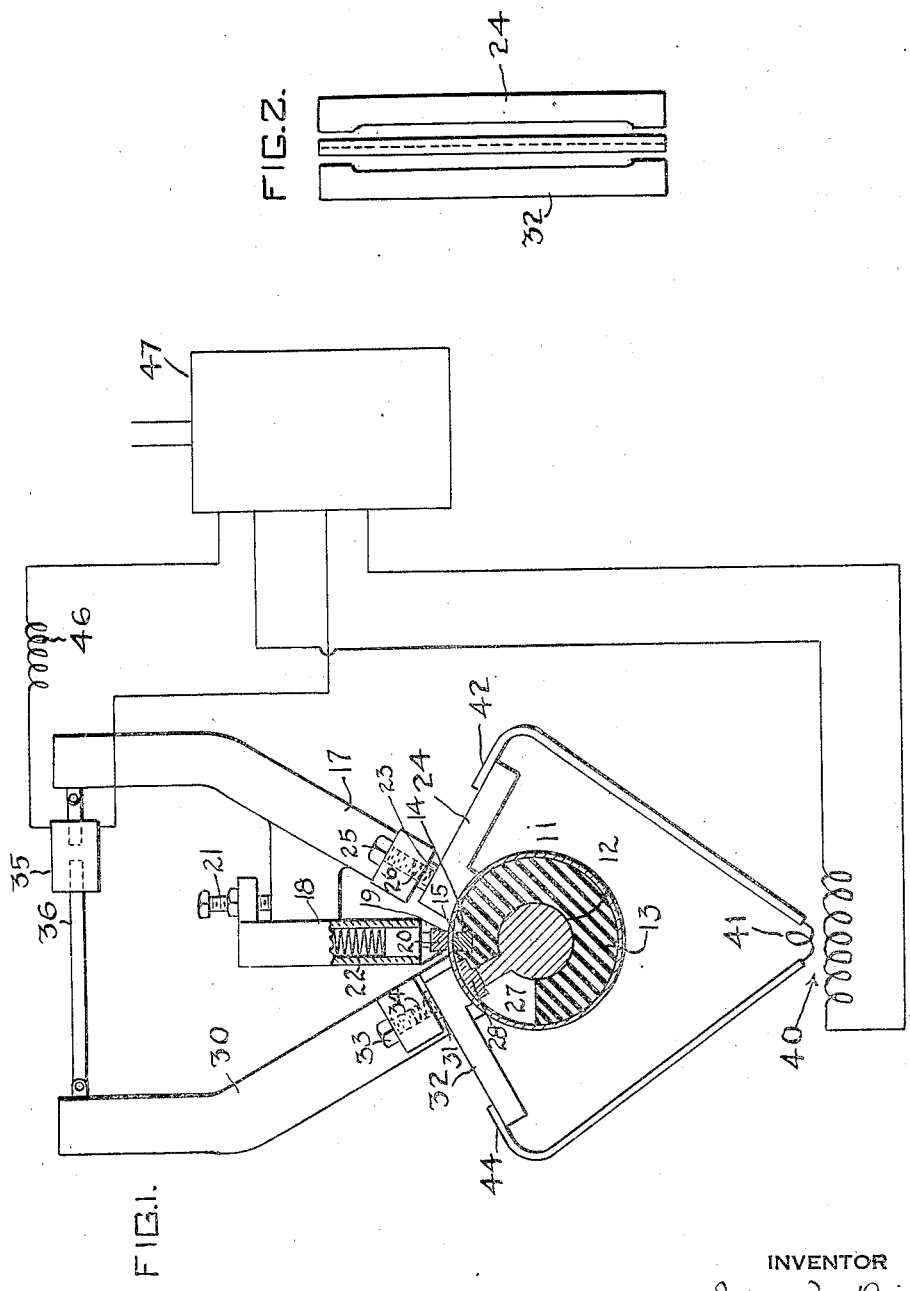
INVENTOR
BY Isaac M Diller
ATTORNEY

UNITED STATES PATENT OFFICE 2,402,381

PROCESS OF WELDING AND APPARATUS THEREFOR

Isaac M. Diller, Upper Montclair, N. J.

Application February 6, 1943, Serial No. 474,945

8 Claims. (Cl. 219—10)

This invention relates to a process and apparatus of welding thin metal elements, particularly adapted for use with very thin sheets, for example, the sheet metal used for the construction of containers such as tin cans, and having preferably a thickness of the order of 8 to 13 thousandths of an inch, but also available up to sixty thousandths, and to small wires.

Much technique has been developed in the butt welding of heavier sheets, but the principles and practices thus developed have had rather unsatisfactory results whenever attempt has been made to apply them to very thin sheets.

These sheets, moreover, particularly when constructed for use in sheet metal containers, are of special compositions and have special physical and chemical properties, and successful welding requires that the welding operation shall preserve in so far as possible these same properties. Thus the metal for cans is normally of a composition in which the physical properties are obtained, by working rather than through heat treatment. The ideal welding process must insure a complete union of the edges of the sheet without softening the adjacent sheet and without leaving any weakness at the weld line either through brittleness or softness, or imperfect union. That is the metal at and adjacent to the weld should have the same properties as the body of the sheet and the weld must be hermetically perfect, and it must be able adequately to withstand subsequent flanging and double seaming operations. It is an object of this invention to attain these results as far as possible.

It is a further object to provide a process in which the heating is concentrated at the abutting end surfaces which comprise the surfaces of contact. This is important for one reason because if the metal back from the weld surface is heated it tends to expand lengthwise, and, being confined by the colder metal further back it buckles out of line tending to weld at the center only.

It is also important because undue heating of the metal back of the weld adversely affects the physical properties and chemical composition of the metal, and adversely affects the appearance, and may damage any coatings.

It is also important that the softened material be uniformly distributed along and across the weld line and that the metal back of the weld line be kept stiff enough and not be bowed out of position so that the parts will be pressed toward each other uniformly all along the weld line.

For the foregoing reasons I employ the resistance of contact between the weld surfaces themselves as the means for the resistance heating; so that the concentration of energy at this point is greater than in the adjacent metal. In any event, the contact resistance will be greater than the equivalent resistance of the metal but it is desirable to increase this factor during the heating period by making it a poor or light contact during the heating period. After the surfaces become highly heated, the temperature resistance coefficient itself will assist in localizing the heating.

It is an important aspect of this case, as applied to unit welding i. e. welding simultaneously the entire complementary lengths of the edges of thin sheets, that the application of the current at a point spaced from the seam or weld line makes it possible to adjust the resistance between the sheets at the seam or weld line independent of the pressure of the electrodes.

It is a further object, therefore, to provide a process of butt welding in which the contact resistance is utilized to localize the heating, but in which these contact conditions are automatically altered during the welding operation to insure full heating of abutting metal without overheating the adjacent metal and yet at the same time, to bring the parts firmly together as to secure perfect union, at the proper instant.

More particularly I prefer to start the welding operation with the abutting surfaces in light contact and then, as the metal approaches fusion, to bring them together with a firm pressure, for the purpose of rapidly and effectively distributing the flow of metal.

Another important factor in securing satisfactory results is the speed with which the operation is conducted. The high temperature at the weld surfaces quickly heats the adjacent metal, if the heat is applied for too long a time. Satisfactory results have been attained utilizing one cycle or less of sixty cycle alternating current with the current duration less than half a cycle. A higher frequency such as 300 or 500 cycles offers certain advantages since at high speed welding these higher frequencies make the process less sensitive to the exact synchronization of the beginning of the welding cycle with the current cycle. Similar advantages flow from the use of a short discharge of direct current. In this way, the operation is more readily controlled and the results more reliably duplicated.

Another important factor in localizing the heating is that the electrodes shall be laterally spaced from the weld line so that these conductors shall not conduct the heat away from the weld. Then by passing current from one to the other through the metal sheets and across through the resistance of the contact between them, I obtain the greatest effectiveness.

With the process conducted under the conditions I have mentioned, with the electrodes spaced approximately 1/8" from the weld line, I have succeeded in effecting a complete weld without raising the temperature of the metal one hundredth of an inch from the weld above an objectionable degree.

I have found it desirable to apply pressure on the faces of the sheet at the weld line from a non-conducting or high resistance refractory material, such as Carborundum, or graphite coated zirconium silicate for the purpose of preventing the fused or softened metal from flowing out from between the sheets or spattering or burning or from being extruded more than slightly beyond the normal surfaces of the sheet by the pressure which is applied, and to maintain the edges of the sheets correctly in alignment until the welding is complete. The material should, however, be of high enough resistance not to short circuit the heating current across the weld line. I have termed these refractory blocks applied in this manner as positioning-retaining blocks or more conveniently PR blocks.

In the form of the invention now best known to me, the edges of the metal sheets are clamped parallel to, and close to but not at the seam or weld line, at least one member of each clamp being an electrode, and at least one clamp is movable toward and from the other. The PR blocks are pressed against and bridge the abutting edges at the seam or weld line, with sufficient pressure to hold the metal in place but not enough to prevent one end slipping beneath the block.

I may start the process with the abutting edges in actual contact—but with the apparatus I have employed, I have found it simpler to secure a proper coordination of the various factors by starting with the sheets separated from twenty to thirty thousandths of an inch.

Where sixty cycle current is employed, it is important to insure that the welding is kept in phase with the current. For this purpose, it is convenient to employ an electronic control which can start the movement of the clamps toward each other—the timing being such that the welding surfaces are fully heated to the welding temperature while the sheets are in light contact and before the preferential heating is over, and then, as a part of the same motion, the pressure being maintained until the metal has cooled or stiffened. The parts are firmly joined, the current being maintained only long enough to secure perfect union. Such PR blocks serve also to prevent or limit oxidation of the heated metal at the weld line. This is important with these thin sheets because very little oxidation can be tolerated.

There appears to be, moreover, a fluxing action which these PR blocks achieve which assists in making the weld. The surfaces of the edges to be welded must fit accurately enough together so that the fluid or softened metal may fill all the interstices between them. If, therefore, the sheets are cut in a manner to leave a burr, it may under some circumstances be found desirable to hone the edges of the sheets in advance.

While I have preferred to secure the high resistance by a light contact between the parts, it is possible also to utilize roughened surfaces of contact, if the roughness is not too great and is reasonably distributed. In such a case, the meeting projections serve as the initial heating element, and the edges of the body of the sheets are brought into contact, with the softened metal of the projections fitting in between them as soon as the projections can flow. It is possible to conduct the process in this manner by a resilient pressure between the sheets which automatically brings them together as the meeting projections soften.

Particularly in the light gauges it is essential to avoid burning of the metal and to hold the temperature short of vaporization as even a slight loss of metal by burning, spattering or running will destroy the hermetic quality of the weld and while the PR blocks enable the control of these factors within sufficiently practical limits, to enable the use of this process in the high speed manufacture of cans for food preservation and container uses there is a limit beyond which even the PR blocks will not help.

The invention accordingly comprises a method embodying the advantages and accomplishing results and involving the relationship of the steps one to another which will be exemplified in a method herein described and the scope of the application of the invention will be indicated in the claims.

For a fuller understanding of the nature and objects of the invention, reference should be had to the following detailed description taken in connection with the accompanying drawing, in which:

Fig. 1 is a diagrammatic elevation of an apparatus by which this process may be carried out.

Fig. 2 is a detail of the electrodes.

The particular apparatus illustrated for the carrying out of the process in the making of sheet metal containers, as an example, comprises a frame on which is mounted a horizontal stud shaft or mandrel 11 of substantially the diameter of the can to be formed, which is preferably of non-magnetic material, and which has a non-conducting surface so that there can be no short circuit between the electrodes through the shaft. I prefer to make it with a metallic core 12 having an insulating sleeve 13.

This shaft or mandrel is provided with a longitudinal recess 14 to receive a block 15 of hard refractory and electrically non-conducting material such as Carborundum which forms one of the PR blocks.

The frame 10 has an upward extension 17 on which is slidably mounted a frame 18, carrying at its inner end a support 19 for a PR block 20 complementary to the block 15 and in registry therewith. The position of frame 18 toward and from block 15 is determined by any convenient means; in normal operation this may be a cam, but any means will serve. As for example, by set screw 21, whereby the pressure of the PR blocks 15 and 20 against the sheet at the weld may be adjusted. For any fixed set of conditions, the pressure during welding will be of a fixed value corresponding to a fixed end position of the screw 21. Springs 22 are preferably interposed between the screw 21 and the support 19 to insure a more uniform pressure for any given screw position.

Mounted also upon the frame 10 is a second frame 23 carrying an electrode 24 parallel to and spaced from the weld line beneath the PR block 20 and this frame also is slidable and has its position toward and from the shaft 11 determined by screw 25 bearing through springs 26.

The shaft or mandrel 11 has a segment 27 cut out adjacent to the PR block 15, on the side opposite the electrode 24 to make room for a support or clamping member 28 having its outer surface lying in the inner surface of the can to be formed. This support is carried upon an arm 30 pivoted for movement about the axis of shaft 11 carrying with it the support 28 within the cutout segment 27, and within the circumference of the can to be formed.

Also mounted upon the arm 30 is a frame 31 carrying an electrode 32 in alignment with support 28. The frame 31 is shown as adjustable toward and from support 28 by screws 33 acting through springs 34.

This electrode 32 is also parallel to but spaced from the weld line. With this construction, as will be seen the opposing edges of the can body blank or sheet, or let us say sheets for it is not material whether they be ends of the same sheet or not, so far as the welding process is concerned—the opposing edges of the sheets may be clamped respectively between the electrode 24 and the shaft 11 and between the electrode 32 and support 28. The sheets have their edges brought close together, and are then lightly clamped between the PR blocks 15 and 20, the PR blocks thus bridging the seam or weld line.

Means are provided for moving the electrodes 24 and 32 toward the PR blocks in time with the application of the welding current. As shown this comprises a magnet or solenoid 35 mounted on frame 10 and having an armature 36 connected to the arm 30.

Current is derived from a transformer 40 having a secondary 41 one terminal of which directly is connected at 42 with the electrode 24 and the other terminal 44 with electrode 32.

The magnet 35 is connected with the electric current as for example with the primary of the transformer 40, preferably through a resistance 46 by which its power and its phase may be adjusted. With this construction its action is controlled by the same device which controls the heating current so that synchronization is achieved automatically.

Since the welding operation may be advantageously conducted within a single cycle of current, it is important that the operation be properly timed with respect to that cycle. For this purpose, I employ a standard electronic timer 47. Such a device makes it possible to control the operation in advance and render it adjustable relative to the current cycle. This apparatus, however, is standard apparatus available on the market and so need not be described in further detail here. It has been found that when the current flows from electrode 24 to electrode 32, there is a tendency for the current to become localized at one part of the weld, as for example at the center. To overcome this difficulty, I prefer to so shape the electrodes as to be farther spaced from the weld line at such points restoring even distribution across the weld line by the added resistance of the metal thus introduced. Thus as shown in Fig. 2, the electrodes are bowed or recessed away from the weld line at the centers.

To carry out this process with the apparatus described, a can body is inserted over the mandrel 11 with the ends or edges of the strip or blank from which it is formed opposite each other, or if separate sheets are to be joined, the ends or edges of the sheets are placed opposite each other, upon the lower PR block. Whether these ends are in actual contact or not will depend upon the actual coordination of timing which has been chosen. If the constants of the device, including the speed with which the magnet starts the lever in motion and the timing of the commencement of the welding current are slow, the ends may be placed in light initial contact, but in many cases it may be found that it is desirable to space the ends initially, about twenty to thirty thousandths of an inch, so that the beginning of the actual flow of the heating current is timed to begin by the initial contact of the edges to be welded during the moving of the parts, as will be described. Adequate current is thus provided during the period while the edge to edge contact pressure is light, so that the parts will be at welding temperature when the parts come into firmer contact.

When the ends have been positioned, they are clamped between the PR blocks, by pressing the block 20 inwardly against the block 15 by screw 21 or other suitable means. This pressure must be firm enough to position or hold the abutting edges of the sheets in alignment and prevent overlapping, but not high enough to prevent a slight movement of one sheet end or edge between the blocks; whereupon the electrodes 24 and 32 are clamped upon it by screws 25 and 33 or other suitable means.

The electronic timer 47 is preferably so adjusted as to condition the timer circuit for a flow of current at substantially the beginning of the electric cycle, but the actual flow of the heating current does not start until the magnet has moved the arm 30 enough to bring the edges of the sheets into contact.

During the first instantaneous period of light contact, the heating is concentrated at the weld line by reason of the contact resistance, from then on for an instant it is still concentrated at that point by reason of the increased resistance due temperature-resistance co-efficient of the metal. Substantially as soon, however, as the full pressure is reached, the abutting edges have been raised to the point of fusion or near fusion. It is desirable that the temperature be raised to the point where the metal is at least quite soft, in order that it may be caused to unite fully and to spread to occupy all cavities caused by slight irregularities of the meeting surfaces, and to spread out against the PR blocks in order that there shall not be any undue line of depression at the line of weld. The PR blocks prevent an excessive extrusion of the metal. A slight extrusion may be obtainable and in some circumstances is desirable to permit cold working. A hermetic seal and a ductile structure are also of importance.

I have also found it desirable that the current shall continue to flow at least until the union is complete as the line of softened metal is extremely thin: A poor union may be caused if the current is cut off too soon; the parts should, therefore, be held together till cooled beyond plastic state.

The distance between the electrodes and the weld line is also a matter of some importance. If this distance is too great, there is not sufficient rigidity of the sheet between the electrodes and the weld line, and also the resistance of the sheet itself adds unduly to the power losses. This distance must, however, be kept sufficient to place the electrodes at a point which is not substantially heated by the weld temperature, so that the electrode contact will not substantially withdraw heat from the weld. The temperature gradient as we pass from the weld line into the sheet toward the electrode is very sharp, and I have found, under the circumstances herein described, that the distance of one-eighth of an inch on each side is adequate, while much greater distances are not satisfactory.

Moreover, the spacing of the electrodes from the weld line is an important factor in determining the temperature gradient, and thus in determining the hardness of the metal at the weld. The amount of fused or softened metal is extremely small and the gradient very sharp. The factors of time and degree of heating must therefore be coordinated to insure the desired mechanical and physical properties, to prevent the fused or softened metal from being unduly heated or quenched.

This invention has been described in connection with apparatus by which the end edge of one sheet is brought into contact with and welded to the end edge of the other sheet. It is, however, possible to obtain many advantages of the invention where an end edge of the sheet is to be welded to the face of the adjacent sheet close to or at the edge thereof and such construction has some of the advantages that accrue from bringing the end surface into abutment since the surfaces of contact between the two sheets are small and permit the concentration of the contact resistance.

The thermal efficiency of the process as conducted is quite high, by reason of the fact that the resistance is concentrated at the weld line and at that point the heated metal is protected against cooling by the PR blocks while at the same time the relatively cold electrodes are sufficiently removed from the weld line so that they do not withdraw heat at the point where it is required and yet they are close enough and there is sufficient difference between the resistance of the weld line and of the body of the metal so that no great loss of heat occurs in the can body because of the spacing.

It is desirable that the working surfaces of the PR blocks be smooth and of low coefficient of friction and reasonably well fitting to the surfaces of the metal. These PR blocks can also be used to flux or clean the surfaces of the metal while the edges are being welded. Thus, zirconium silicate will combine with and carry away slag and oxide. Graphite coating of the blocks or graphite in the composition of them or a compound capable of releasing carbon will tend to prevent decarburization as well as to clean the surfaces of oxide or to further prevent such oxidation.

The evolution of gases as the graphite burns will further enable the PR blocks to keep air away from the joint even though the PR blocks themselves do not conform to the surfaces with exactitude. Such blocks can also be of a composition such as one containing insoluble sodium silicate which seems to impart a film to the hot metal that remains silvery and non-corrosive.

This invention has particularly been described in connection with sixty cycle current, because that is the current which is widely used, but energy storage systems may be used with unidirectional energy to give a momentary high current discharge without undue withdrawal of current from the mains, and where high frequency is available such as 300 to 500 cycles, it may be employed without the process being so dependent upon synchronization of the welding operation with the current as where sixty cycle current is used.

One of the important results of this invention, lies in the fact that the weld after it is completed is free from any substantial fin or web at the weld line and so ordinarily it is not required to use special apparatus to produce a smooth effect.

In many instances, I have found that the character of the weld is improved by subsequent treatment of a mechanical nature, such for example, by rolling or hammering which seems to homogenize the metal at the weld and reduces the strains in the metal.

This process has been particularly described in connection with the welding of thin sheets, but it is applicable also to the welding of small wires or rods, or the ends of thin metal strips.

The term "very thin sheet metal" appearing in the claims herein is meant to include more particularly sheet metal having a thickness of the order of eight to sixty thousandths of an inch.

Having described my invention, what I claim as new and desire to secure by Letters Patent is:

1. The process of forming container bodies, comprising the steps of providing a blank of very thin sheet metal, forming said blank into the container body shape, aligning the complementary edges of the blank, bringing said edges into light edge to edge contact to provide a very high resistance to the flow of electric current from edge to edge, confining narrow edge zones of said blank between a pair of opposed cooperating members of electrically non-conducting refractory material, said members firmly engaging said edge zones and bridging the seam therebetween and maintaining said aligned edges in lateral coextensive relationship therebetween, conducting a current to said edge zones for a period in the order of a fraction of a second, edge to edge contact being maintained during all of said period, said current passing through said high resistance contact and developing sufficient heat along such contact to bring the contacting faces of said edge zones to welding temperature, the zone of welding temperature being substantially confined to the contacting faces, pressing said edges together and coalescing the softened metal in the contacting faces into a uniform cast weld.

2. The process of forming container bodies, comprising the steps of providing a blank of very thin sheet metal, forming said blank into the container body shape, aligning the complementary edges of the blank, bringing said edges into light edge to edge contact to provide a very high resistance to the flow of electric current from edge to edge, confining the narrow edge zones of said blank between a pair of opposed cooperating members of electrically non-conducting refractory material, said members firmly engaging said edge zones and bridging the seam formed therebetween, conducting an electric current to said edge zones while substantially maintaining said high resistant light contact, said current passing through said high resistant contact developing sufficient heat along said contact to bring the contacting faces of said edge zones to welding temperature in a fraction of a second without injuriously heating the remainder of the blank, subjecting the edges to a progressively increasing pressure against each other so that the softened or molten metal is uniformly distributed between said members, and coalescing the contacting faces into a uniform cast weld.

3. A process of edge to edge welding complementary edges of very thin metallic sheet material, comprising the steps of aligning said edges, bringing said material into light edge to edge contact providing a very high resistance to the flow of current from edge to edge, confining narrow edge zones of said sheets between opposed members of non-conducting refractory material, each member bridging the seam between the edge zones for retaining any fluid metal, passing an electric current for a fraction of a second between said zones and through said light high resistance edge to edge contact, said current having a sufficient magnitude to heat the contacting faces of said edge zones to welding temperature locally and rapidly and simultaneously along their entire length, while maintaining edge to edge contact during the entire period of current flow, interrupting the current flow, firmly pressing said edges together and coalescing the soft metal into a uniform cast weld between said members without appreciable loss of heated metal.

4. The process of forming container bodies, comprising the steps of providing a blank of very thin sheet metal, forming said blank into container body shape, aligning the complementary edges of the blank, bringing said edges into light edge to edge contact to provide a very high resistance to the flow of electric current from edge to edge, confining narrow edge zones between a pair of opposed cooperating members of electrically non-conducting refractory material, said members firmly engaging said edge zones and bridging the seam therebetween for maintaining said aligned edges in lateral coextensive relationship therebetween, initiating a welding current to said edge zones through said high resistance contact, simultaneously beginning a progressive increase of the pressure between said edges, continuing said current and said progressive increase of pressure to maintain edge to edge contact, developing sufficient heat along said contact during a fraction of a second to bring the contacting faces of said edge zones to welding temperature, the zone of welding temperature being substantially confined to the contacting faces, and coalescing the heated metal in the contacting faces into a uniform cast weld.

5. The process of forming container bodies, comprising the steps of providing a blank of very thin sheet metal, forming said blank into the container body shape, aligning the complementary edges of the blank, bringing said edges into light edge to edge contact to provide a very high resistance to the flow of electric current from edge to edge, confining the narrow edge zones of said blank between a pair of opposed cooperating members of electrically non-conducting refractory material, said members firmly engaging said edge zones and bridging the seam therebetween, initiating an electric welding current to said edge zones while in said high resistance light contact, continuing said current and simultaneously subjecting the edges to a progressively increasing pressure against each other so that no gap can be formed during the fraction of a second of current flow, said current developing sufficient heat along said contact to bring the contacting faces of said edge zones to welding temperature without injuriously heating the remainder of the blank, the increased pressure causing the heated metal to be uniformly distributed between said confining members, and coalescing the contacting faces into a uniform cast weld.

6. A process of edge to edge welding complementary edges of very thin metallic sheet material, comprising the steps of aligning said edges, bringing said material into light edge to edge contact providing a very high resistance to the flow of current from edge to edge, confining narrow edge zones of said sheets between opposed members of non-conducting refractory material, each member bridging the seam between the edge zones for retaining fluid metal, initiating an electric current between said zones while under said high resistance light contact, continuing said current flow for a period in the order of a fraction of a second while progressively increasing the pressure between said edges to maintain them in contact, coalescing the heated metal into a uniform cast weld between said members, and immediately thereafter relaxing said pressure.

7. Apparatus for electrically welding the side seam edges of thin sheet metal containers, comprising in combination, a mandrel for supporting and shaping a container body blank, heat resistant and electrically resistant positioning and retaining members engageable with and bearing upon opposite surfaces of the free edges of said body blank and extending across said edges, said members also maintaining said edges in lateral coextensive relationship between said members and guiding said edges into abutting engagement when they are moved toward each other for the welding operation, a pair of electrodes spaced transversely from said edges and adjacent said positioning and retaining members, at least one of said electrodes being movable relative to the other, a clamping member associated and movable with said movable electrode and adapted to clamp one of said edges between said clamping member and said movable electrode and to press said clamped edge against the other edge, electric means for passing an electric current through said electrodes and through said edges to weld said edges together simultaneously along their entire length, and means for simultaneously bringing said edges into initial light contact and for pressing said edges together with increasing pressure, and means for synchronizing the beginning of flow of said electric current with said initial light contact.

8. Apparatus for electrically welding the side seam edges of thin sheet metal containers, comprising in combination, a mandrel upon which a container body blank is adapted to be shaped and supported, heat resistant and electrically resistant positioning and retaining members engageable with and bearing upon opposite surfaces of the free edges of said body blank and extending across said edges, said members also maintaining said edges in lateral coextensive relationship between said members and guiding said edges into abutting engagement when they are moved toward each other for the welding operation, one of said members being included in said mandrel and the other of said members being outside of said mandrel and movable relative thereto and into alignment with said first member, a pair of electrodes positioned on opposite sides of said second member, at least one of said electrodes being movable relative to the other, a clamping device associated with said mandrel and movable with said movable electrode and adapted to clamp one of said edges between said clamping device and said movable electrode and to press said clamped edge against the other edge and electric means for passing an electric current through said electrodes and through said edges to weld said edges together along their entire length.

ISAAC M. DILLER.